United States Patent

[11] 3,598,470

| [72] | Inventor | Richard Harold Vetter<br>Pacific Palisades, Calif. |
|---|---|---|
| [21] | Appl. No. | 874,311 |
| [22] | Filed | Nov. 5, 1969 |
| [45] | Patented | Aug. 10, 1971 |
| [73] | Assignee | Prismalite, Inc.<br>San Francisco, Calif.<br>Continuation-in-part of application Ser. No.<br>779,722, Nov. 29, 1968, now abandoned. |

[54] PROJECTION SCREEN AND SYSTEM
39 Claims, 16 Drawing Figs.

| [52] | U.S. Cl. | 350/117 |
|---|---|---|
| [51] | Int. Cl. | G03b 21/60 |
| [50] | Field of Search | 350/117,<br>127, 128, 129 |

[56] References Cited
UNITED STATES PATENTS

| 1,666,808 | 4/1928 | Buchner | 350/128 |
|---|---|---|---|
| 1,942,841 | 1/1934 | Shimiza | 350/128 |
| 2,268,351 | 12/1941 | Tanaka | 350/128 |
| 2,358,070 | 9/1944 | Holmes et al. | 350/128 |
| 2,660,927 | 12/1953 | Burton | 350/129 |
| 2,991,693 | 7/1961 | MacNeille | 350/128 |
| 3,180,214 | 4/1965 | Fox | 350/128 |

FOREIGN PATENTS

| 666,222 | 2/1952 | Great Britain | 350/128 |
|---|---|---|---|

*Primary Examiner*—Donald O. Woodiel
*Attorney*—Angus & Mon

ABSTRACT: This invention relates to a projection screen and to a projection system incorporating it. The screen comprises a plate of transparent material having a face toward the viewer formed of generally horizontal optical wedges, and a face away from the viewer formed of generally vertical curved surfaces which are axial portions of circular cylinders. The circular surfaces fan out a beam in a controlled pattern, and the wedges refract the beam away from the normal to the screen. Preferably the front face is frosted to a diffusive but primarily transmissive condition. In the preferred embodiment for front projection, the curved surfaces are concave toward the front face and are coated with a reflective material, and the front faces of the wedges are lenticularly curved.

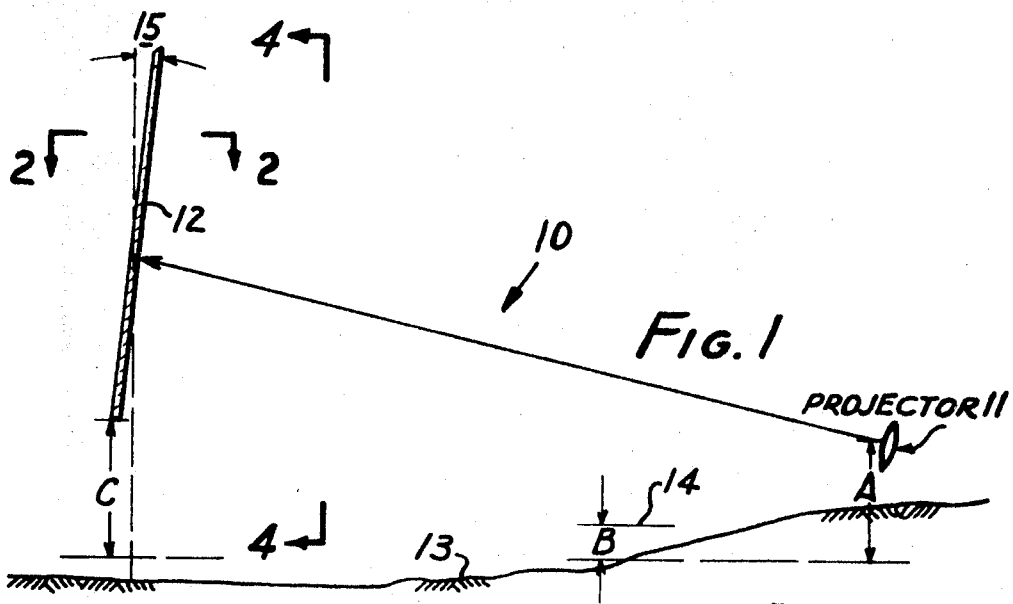
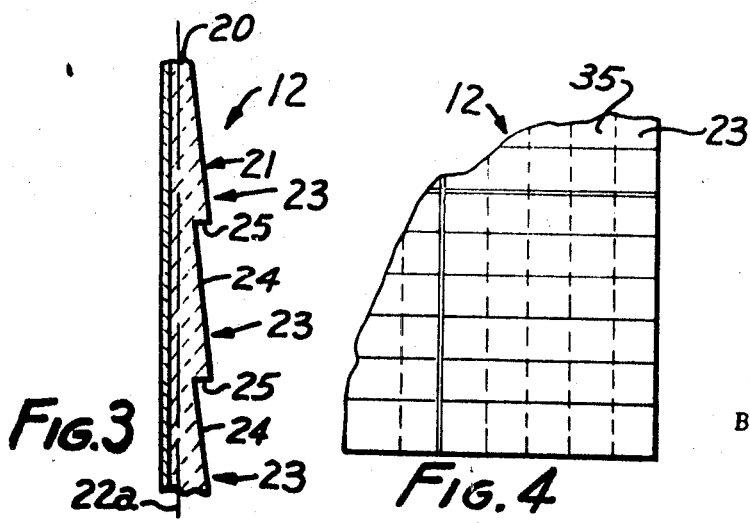

INVENTOR.
RICHARD H. VETTER

BY Ayres & Moe
ATTORNEYS.

PROJECTION SCREEN AND SYSTEM

CROSS-REFERENCE TO OTHER APPLICATIONS

This application is a continuation-in-part of applicant's copending U.S. Pat. application, Ser. No. 779,722 filed Nov. 29, 1968, entitled "Projection Screen and System", now abandoned.

This invention relates to a projection screen and to a projection system which incorporates it.

In the projection of motion pictures, adverse effects of ambient light, relatively limited light sources found in places such as schoolrooms and outdoor theatres, and excessive scattering of light by conventional screens, combine to reduce the quality of a projected image. Often the image is difficult to perceive, and the brilliance of the colors and their contrast with one another are substantially washed out. As a result, it is difficult to project films in daylight environments so that students could both watch a projected movie and take notes. Also, it is not feasible to start outdoor motion pictures at a sufficiently early hour to secure maximum economic advantage to the owner of the other facilities of the theater such as the snack bar.

The screen of this invention and its projection system can advantageously be used in any environment wherein conventional motion picture systems are currently employed. However, its principal utility at present is in the filed of outdoor drive-in motion picture theatres, and without limiting the generality of this invention, it will be described in detail with particular emphasis on this application.

During the summer season, especially in the midwest, many outdoor theaters are unable to open until after 9:30 p.m. Quite apart from the social complications involved in such late openings, the situation is economically disadvantageous to the theater owners for the reason that the snack bar trade is greatly reduced because many children will already be asleep, and also because many persons will have had their snacks before going to the theater. One reason for the delayed opening hour is that twilight lasts to quite a late hour in many parts of the world during the season when outdoor motion picture theaters have their greatest appeal, and the amount of ambient light present, especially from horizon glow, washes out the desirable vivid qualities of a well-produced motion picture to the extent that colors are not true and the contrast between them, which forms such an important part of the motion picture presentation, is substantially eliminated. Often the colors are so washed out as to be untrue as to tone.

The screen of this invention provides an image which is brilliant, even in the presence of significant levels of ambient light, within a substantial viewing area. This viewing area includes the economically useful portions of a motion picture theater. Light is not wasted to other regions, and the image cannot be seen from these other regions. The image which this screen forms is very brilliant and, compared to an adjacent matte screen, is vivid and enjoyable, while an image simultaneously cast on a matte screen is barely discernable. Accordingly, this screen, which is able to return high percentage of light to the audience area and to reject substantial amounts of ambient light, is able to provide a picture that is visible and enjoyable at an earlier hour in the evening, and thereby overcome many of the economic disadvantages which are associated with the use of prior art screens. In ambient light this screen appears almost muddy compared to an adjacent matte screen. However, when the image is simultaneously projected on both this screen and on a matte screen, it has been found to return almost 3½ times as much light to the audience as the matte screen. The matte screen is at present the standard for outdoor screens, and it has found that this more than trebling of the light to the audience creates saturated color tones, sharp image definition, and an enjoyable presentation under circumstances wherein a conventional screen will not work at all, and as to outdoor theaters, at a much earlier hour.

A projection screen according to this invention comprises a plate of transparent material which has a reference axis, a front face facing the viewer and a back face on the opposite side therefrom. A plurality of generally horizontal optical wedges forms the front face. Each of these wedges comprises a transmission surface and an offset surface. The transmission surfaces diverge from the reference axis, and each offset surface extends between respective edges of the two adjacent transmission surfaces adjacent to it. The optical wedges are parallel to each other. A plurality of axially extending curved surfaces form the back face. They are parallel to each other and each comprises an axial segment of a circular cylinder. In plan view, they are generally normal to the optical wedges. The principal Property of the optical wedges is to refractively direct an incident light beam away from the normal to the screen, and in the preferred embodiment to give a controlled "fanning" in the vertical plane. The principal property of the back face is to cause an angular fanning of the beam that emerged from the front face as viewed in the horizontal plane.

According to one embodiment of the invention used for front projection, a reflective coating is applied to the back face, the curved surfaces being concave toward the front face.

According to another embodiment of the invention used for rear projection, the curved surfaces are convex toward the front face and the second face is transmissive.

According to a preferred but optional feature of the invention, the front face is frosted so as to be somewhat diffusive but primarily transmissive.

According to still another preferred but optional feature of the invention, the transmission surfaces are lenticularly curved, rather than flat, so as to provide a fanning of the reflected rays in the vertical plane.

The above and other features of this invention will be fully understood from the following detailed description and the accompanying drawings in which:

FIG. 1 shows a projection system incorporating the invention;

FIG. 2 is a cross section taken at line 2–2 of FIG. 1;

FIG. 3 is a cross section taken at line 3–3 of FIG. 2;

FIG. 4 is a right-hand view of FIG. 2;

FIG. 5 is a fragmentary cross section of another embodiment of the invention;

FIG. 6 is a cross section taken at line 6–6 of FIG. 5;

Figure 9:
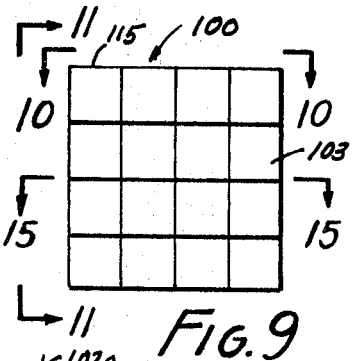
FIG. 9 is a plan view of a module of the presently preferred embodiment of the invention.
Figure 15:
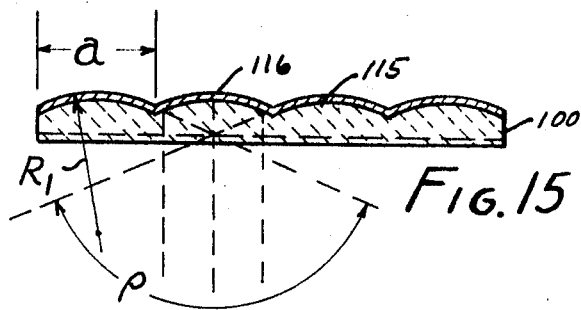
Figure 11:
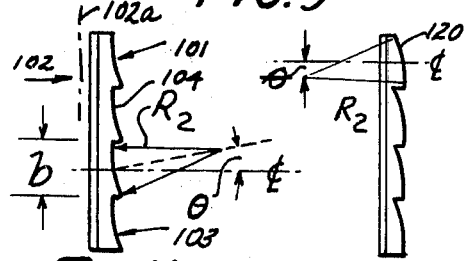
Figure 12:
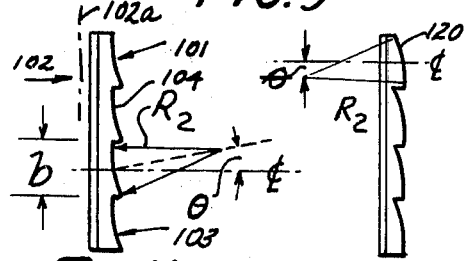
Figure 10:
Figure 14:
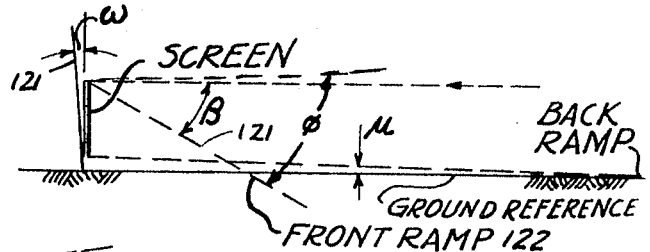
Figure 13:
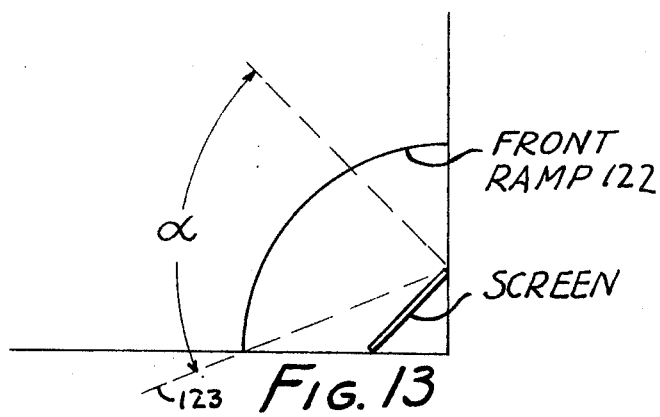

FIGS. 10 and 11 are respectively top and side views taken at lines 10–10 and 11–11 of FIG. 9;

FIG. 12 is a side view of another embodiment of the invention;

FIGS. 13 and 14 are respectively plan and elevation views of an outdoor theater illustrating the design parameters of the screen of FIG. 9;

FIG. 15 is a cross section taken at line 15–15 of FIG. 9; and

Figure 16:
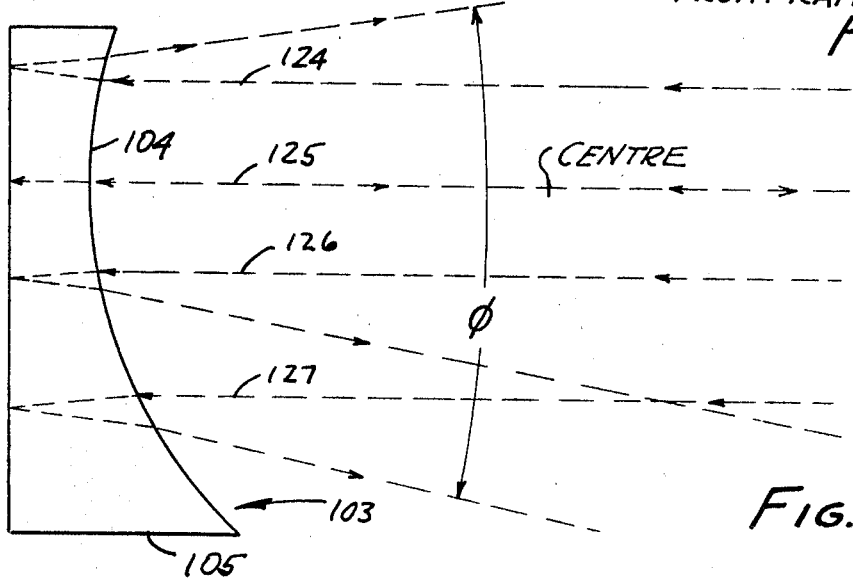

FIG. 16 is an enlarged cross-sectional fragment of the screen of FIG. 9 showing some of its properties.

FIG. 1 sows a projection installation 10 which for convenience may be regarded as an outdoor theater, although the same arrangement is also suitable for walk-in theaters or other classes of exhibition including, with a different embodiment of the screen, rear projection. This system includes a projector 11 of conventional design and a screen 12 according to the invention. There is an audience area 13 with a member 14 schematically illustrated. The screen is tilted toward the audience at an angle of tilt 15, the screen itself having a reference axis 16 making said angle. Ordinarily, angle 15 will be relatively small, and may even be zero. It will not ordinarily be negative in the sense of tilting away from the audience.

Conventional screens usually are tilted toward the audience at about 3°—5°. This screen functions well when tilted to from an angle 15 between about 0° to about 6°. An angle 15 between 1° and 5° is the most useful range. Angulation between 0° and 6° is sometimes referred to herein as a "small angle." A customary relationship between dimensions in a conventional theater is shown herein relative to a datum base line. The projector will usually be at an elevation A which is about 13 feet, and its axis is tilted upwardly. The viewer's eyes at an elevation B are ordinarily between about 4 and 5 feet above the datum, and the bottom of the screen is at an elevation C above the datum which is ordinarily about 18 to 20 feet above the datum.

The construction of one embodiment of the screen will best be appreciated from an examination of FIGS. 2—4. In FIG. 2, a plate 20 of a clear, colorless, transparent material is shown, which has a front face 21, a back face 22, and a reference axis 16 to which the faces are generally parallel. They are also generally parallel to each other. The front face is formed of a plurality of optical wedges 23. Each optical wedge has a transmission surface 24 and an offset surface 25. Both of these surfaces are preferably planar, and the planar shape of surfaces 24 distinguishes this embodiment from that of FIG. 9. The offset surface interconnects adjacent edges of respective adjacent transmission surfaces, and is not intended to form a part of the optical system itself. Instead, it is contemplated that substantially the entire transmission of light to the audience, and certainly the preponderant portion thereof will be through the transmission surfaces.

The transmission surfaces make an angle 26 with the reference axis which will usually be on the order of about 6°. The offset surfaces may extend at any angle relative to the reference axis, but it will ordinarily be found convenient for them to return at about 90° thereto. It is best for it not to make an acute angle therewith, fir the reason that it would then comprise another optically active surface.

The transmission surfaces are primarily intended for direct refractive transmission of light, but this property may be altered somewhat, if desired, in order to provide a softness to the image which is desirable in motion picture projection. This feature is illustrated somewhat in FIG. 7 wherein a bundle of rays 27 is shown emerging from a single point on the front face. This is intended to illustrate the limited scattering effect of a somewhat translucent, lightly etched surface which will transmit the light, but not a direct image. An image projected on this screen will be seen clearly as such, but there is a softness to it on large screens which is not achieved when the transmission surface is completely clear and transparent. The screen may, however, be completely transparent, and sometimes will be.

The frostiness of this surface may conveniently be produced by lightly acid etching the mold in which the screen is formed. For example, for a front projection screen as shown, etch 0187 of Textured Design Service, 12037 Regentview Ave, Downey, Calif. has been found to be very suitable in producing a surface on the screen which has the desired properties. When the screen is for back projection and transmits the beam, a somewhat heavier etch, namely 0447 of the same company, may advantageously be used. The frosting would theoretically be expected to decrease the efficiency of the screen. However, the extent to which it does so has not been found to be of measurable level on conventional instruments for determining the efficiency of screens.

When the transmission surfaces are primarily clear and not frosted, then it is found advantageous to provide a frosted band on each wedge near the members of that set of intersections, which set is farthest from the reference axis, for example, that set of intersections typified by intersection 30 rather than intersection 31, and the regions just contiguous thereto, such as region 29. A frostiness of the type just described is suitable. It reduces the specular reflection at these sharp corners. For example, on a wedge whose transmission surface is of the order of about 0.25 inches in length, approximately 0.005 inches on each surface adjacent to the intersection will be so treated. This intersection is preferably somewhat rounded or chamfered.

The back face of this screen is best shown in FIG. 2 and is formed of a plurality of curved surfaces 35. These surfaces are axial fragments of circular cylinders, the central axes of which are parallel to the reference axis and which are preferably normal to the wedges. Such a relationship can be seen in FIG. 4. FIG. 4 also illustrates that the total screen 12 may be formed of a plurality of individual plates by attachment to a backing member (not shown).

There is a reflective coating 36 adjacent to the back face. The contiguous portion of this coating comprises the reflective surface for this screen and may be considered a portion of the curved surface itself, because it takes its curvature therefrom. No reflection is desired at the transmission or offset surfaces. The transmission surface is intended as a refractive member, and the offset surfaces are preferably not part of the optical system at all.

Figure 7:
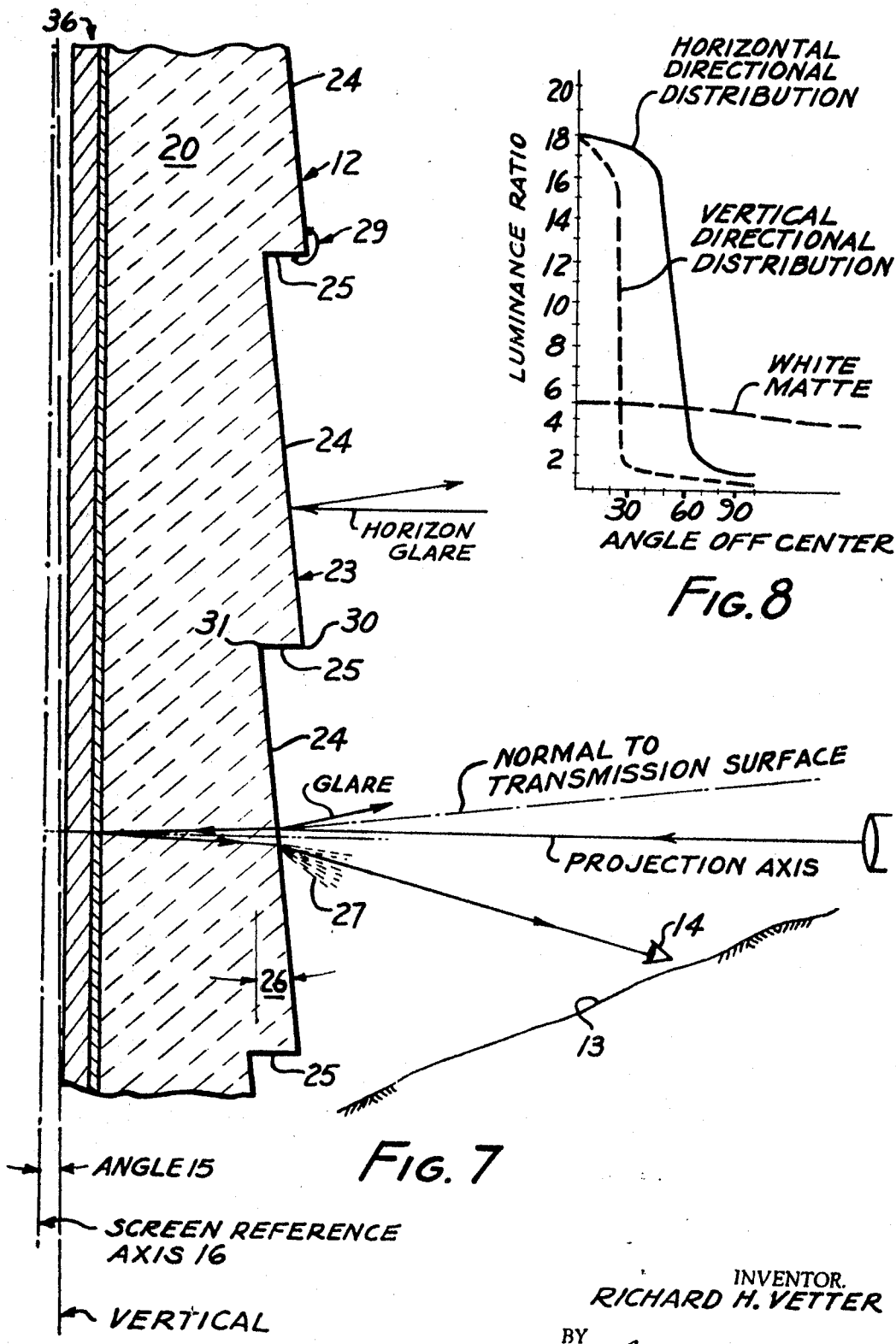
FIG. 7 is an enlarged cross section of a portion of FIG. 2 further illustrating an optical property of the screen of FIGS. 2–6.

The angulation of the transmission surface relative to the system has several advantages which are readily apparent in FIG. 7, wherein the projection axis is shown, and the first surface reflection is labeled as glare which is reflected upward from the audience, while the transmitted beam is reflected at the rear face and then refracted downwardly to the audience. Therefore, the first surface glare is not seen by the audience. Furthermore, the horizon glare, which is the principal portion of the ambient light objectionable to audiences, is also reflected upwardly as can also be seen in FIG. 7.

According to a preferred feature of this invention, the reflective coating is an adhesive member 37 with a metallic coating 38 which performs a reflective function. Obviously it could instead comprise a metallized surface. However, an adhesively applied coating has many advantages in maintenance and manufacture.

One suitable material for member 37 is a Mylar sheet. The Mylar is metallized and the metal is coated with an adhesive. The adhesive is, of course, very thin, and of a material not deleterious to the reflecting function of the metallic layer. The metallic layer on the Mylar is preferably satin in texture rather than smooth, although the latter can be used. ONe satin-type coated Mylar sheet is known as Chromoglow. The material as described will adhere to and seal with the back face of the plate, and will efficiently reflect the incident light. This reflective coating need not be purely specular in nature, although it will be primarily so. Instead, it may be slightly diffusive such as by the sue of the satin surface to give a somewhat softer reflected image, if desired, and such an arrangement will often be desired.

The relationships of the elements of the system as already described are best shown in FIG. 6 relating to front projection, where it will be noted that the screen's reference axis preferably tilts positively toward the member of the audience. The relationships of the elements are greatly distorted in FIG. 6 because of the scale of the drawings used, and it will be understood that the projector cone has a much smaller central angle than that indicated by the drawings. Suffice it to say that the tendency of the front face is to refract the light in such a manner as to cause the light to be directed away from the normal to the screen and, in the system shown, toward the audience.

It will further be noted that the primary function of the curved surfaces is to return the light in a limited fanned out pattern shown in FIG. 2 as pattern 50, as viewed from above, in a horizontal plane.

A large number of incident rays 51 are shown impinging on the screen, and it will be noted that they will be specularly reflected within this limited pattern. Dimensionally, in one useful embodiment, the greatest thickness of the screen measured from the crest of the curved surfaces to one of the intersections 30 is on the order of 0.150 inches. The axial length of one of the teeth is on the order of 0.250 inches, and the length of the offset surfaces is on the order of 0.027 inches. As to the curved surfaces, the chord length of the respective circular surfaces is on the order of 0.25 inches with an angular subtense on the order of about 43° and a radius on the order of 0.452 inches. This screen will restrict pattern 50 to an angle of about 90°, which is a very useful angle for outdoor motion picture theaters, as well as for other usages. There will be substantially no illumination outside this cone. Should the somewhat larger angle for pattern 50 of about 120° be desired, the radius of the curved surfaces may be changed to about 0.390 inches, still maintaining a 0.25 inches chord length. The effect of the foregoing is to confine the light to a restricted fanning out pattern in a horizontal plane and to direct that pattern downwardly toward the audience with the further advantages of reflecting away from the audience the first surface reflection and the horizon glow.

The embodiment of FIGS. 5 and 6 is intended for rear projection and is shown used in combination with a projector 55 which projects toward the rear face 56 of a screen 57. The front face 58 of the screen is identical in all respects to front face 21 of the screen of FIG. 2, and the orientation of the screen toward the audience will be the same. As in the screen of FIG. 2, there is a reference axis 59 which is best seen in the vertical plane. The difference between the two screens is that the screen of FIGS. 5 and 6 is intended for transmission of light rather than for reflection of light and, therefore, the back face is formed of curved surfaces 60 which are convex toward the front face 58 instead of concave toward it as in the screen of FIG. 2. The dimensions of the wedges and of the curved surfaces are the same, but the centers of the curved surfaces are on the opposite side of the rear face. It will be seen from FIG. 5 that the projected rays 61 strike these curved surfaces and are fanned out to a pattern 62 as seen in the horizontal plane which has the same functions and features as pattern 50 in FIG. 2. Therefore, the primary difference between the two screens is in the formation of the second face. The rear face in FIG. 2 is intended for a reflection, while in FIG. 5, it is intended for refraction, but in both cases the property sought is a fanned out pattern in the horizontal plane.

In both cases, the screen shown gives a gain of approximately three and one-half times that secured by the use of white matte materials when the fan angle 50 or 62 is on the order of 90°. In standard indoor Projection, 16 foot lamberts is considered adequate for proper showing. Present day outdoor installations average a brilliance on the order of 3 to 5 foot lamberts or less. This screen in a like installation will produce a brilliance on the order of 10½ to 17½ foot lamberts while it still resists the effects of ambient light.

Figure 8:
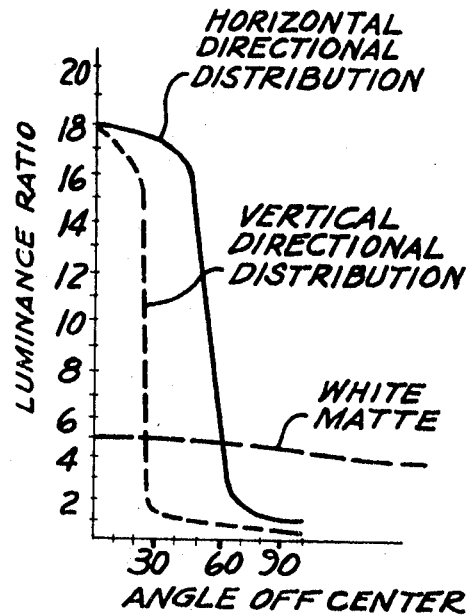
FIG. 8 is a graph showing certain properties of the screens of FIGS. 2 and 5.

FIG. 8 shows the effect of both screens as to luminance ratio in both vertical and horizontal distribution, and compares them to a matte screen. The broken line is the luminance ratio of a matte screen relative to a normal to the screen on both axes (vertical and horizontal). The solid line shows that with either embodiment of this screen, the luminance ratio is about 3½ times that of a matte screen up to about 45° in each horizontal direction from the normal. Beyond that, the level falls sharply. The area under the curve beyond 45° is a very small part of the total and proves the light economy of this screen. The dashed line is a similar curve showing a high luminance, again about 3½ times that of the matte screen, up to about 25° below the normal. Then it, too, falls sharply, with only a minor proportion of the light being distributed outside this restricted region.

The presently preferred embodiment of the invention is shown in FIGS. 9—11 and 16. This device is generally similar to the foregoing embodiments, except for the shape of its transmission surfaces, which are lenticularly curved rather than planar, whereby to provide a fanning of the image in the vertical plane.

As to the thickness of the screens, thickness is no limitation on the invention. It is desirable to provide a vandal-proof screen, and for this purpose a thickness of 0.150 inches or greater is to be preferred. For example, rocks, bottles and the like have been thrown at such a screen without damaging it, and 22-caliber pistol bullets have been fired through the same, and it has been found that the hole created by it merely seems to close upon itself and, at a distance, becomes merely a pinpoint in the image which can scarcely be seen.

Because of the desirability of resisting vandalism, ultraviolet light, and other deleterious features, a polycarbonate material has been found to be preferable. While other conveniently castable transparent materials, such as acrylics, may be used instead, it will be found that they are not as resistive to ultraviolet light, or to missiles and the like, as polycarbonate materials, and the latter are therefore to be preferred. Whatever material is used should be colorless, clear and transparent as to inherent properties. Similarly, the refractive index appears to be of little importance, and any material such as the foregoing appears to meet the requirements thereof. The precise radius of the curved surfaces and the angles of the optical wedges are predicated on the refractive index of the material. The parameters can readily be established with only a minor amount of experimentation. The foregoing dimensions for the screens of FIG. 1—6 have been successfully used with a polycarbonate material, and for the screens of FIGS. 9—12 have been successfully used with an acrylic material.

The number of wedges and curved surfaces used, and their size is immaterial. As shown, the pattern is such that each unit is approximately ¼ inches on a side. This will, of course, produce a graNular image to a viewer of about 16 spots per square inch, and FIG. 9 for example, shows a 1-square-inch module.

A plate 100 of a clear, colorless, transparent material is shown, which has a front face 101, a back face 102, and a reference axis 102a to which the faces are generally parallel. They are also generally parallel to each other. The front face is formed of a plurality of optical wedges 103. Each optical wedge has a transmission surface 104 and an offset surface 105. Surface 105 is planar, and surface 104 is lenticular. It diverges from the reference axis, and is a fragment of a cylinder whose center is located above the centerline 105a of the respective wedge by a distance which is derived by bisecting the arc and placing the center of the arc on the centerline. In the preferred embodiment the elevational length of the wedge is 0.250 inches, the radius of surface 104 is 0.450 inches, and the center point makes an angle $\theta$ with the centerline at the surface of about 70. The arc is approximately 32°.

The offset surface interconnects adjacent edges of respective adjacent transmission surfaces, and is not intended to form a part of the optical system itself. As before, it is contemplated that substantially the entire transmission of light to the audience, and certainly the preponderant portion thereof will be through the transmission surfaces.

The transmission surfaces may be etched as before, and preferably they are etched over their entire surface.

The back face of this screen is best shown in FIG. 10 and is formed of a plurality of curved surfaces 115. These surfaces are axial fragments of circular cylinders as in fig. 2. The central axes of these surfaces are parallel to the reference axis and which are preferably normal to the wedges. Such a relationship can be seen in FIG. 9.

There is a reflective coating 116 adjacent to the back face identical to that of FIG. 2. The contiguous portion of this coating comprises the reflective surface for this screen and may be considered a portion of the curved surface itself, because it takes its curvature therefrom. No reflection of rays from the projector is desired at the transmission or offset surfaces. The transmission surface is intended primarily as a refractive member, and the offset surfaces are preferably not part of the optical system at all.

The radius of surfaces 115 is somewhat larger than that of surfaces 35, because in this embodiment a somewhat wide fanning of the horizontal beam is desired. However, the chord length remains the same.

FIG. 12 indicates that, on the same screen, the curvature of the transmission surfaces 120 may be reversed from concave to convex, and the same properties will be provided. Minor changes in dimensions may need to be made.

It is to be understood that as in the case of FIG. 5, the surfaces 115 may be reversed and the device with transmission surfaces as in either of FIGS. 11 or 12 may be used for rear projection installations.

The design parameters for the screen of FIG. 10 are shown in FIGS. 13 and 14. It is to be understood that it is common practice for the screen to lean toward the audience by an angle $w$ measured from the vertical 121 by as much as 6°. There is a minimum upward viewing angle $u$ of about 1°. There is a minimum upward viewing angle $u$ of about 1°. This is subtractive from the 6° forward tilt. This requires a 5° arc in the vertical plane for a single screen to be applicable for all theaters having screens standing in the arc $w$ from straight up to a 6° leaning angle. Then, in order to accommodate a substantial audience, a useful arc of $\beta=27°$ must be provided. This total of 32° determines the arc of the transmission surfaces, and the location of its center. Note in FIG. 14 that limiting ray 121 intersects the front ramp 122, so that reflections from the entire screen in its vertical axis reach all members of the audience. The following dimensions are postulated: Screen height above ground, 20 feet; screen height, 55 feet; front viewing ramp, 150 feet from screen; back viewing ramp, 1000 feet from screen.

FIG. 13 shows the horizontal limits based on the use of the screen in a 90° corner. An angle $p=2x$ is postulated equal to 135°, with a screen width of 120 feet for the theater postulated above. A limiting ray 123 is shown intersecting the front ramp.

FIG. 16 shows the refractive and reflective effects in the vertical plane. Four parallel rays 124, 125, 126 and 127 are shown impinging on the screen at different elevations. At substantial projection throws and with small vertical wedge dimensions, these represent substantially the same image point. Their rays undergo one internal reflection and two refractions. Ray 124 goes upward, ray 125 on the center is returned, and rays 126 and 127 are deflected downward $\Phi=32°$. Granulation will be seen up close to the screen. However, it disappears to a viewer situated at about 52 feet from the screen and farther. In general, an audience is farther from the screen than 52 feet. On the other hand, these elements can be made as small as 1/32 inch, in which case the granulation will disappear at even closer ranges.

The material must, of course, be of greater density than air to provide for the refractions shown. The material is conveniently cast in platelike panels such as shown in FIG. 4 on the order of size of about 12 times 18 inches, and may be attached to substructure by means of common adhesives such as are used in tiling operations. The term "plate" does not mean only a flat plane, although it includes the same. The plate structure itself may be bent or curved as appropriate.

This screen is convenient to use and needs only occasional rains or hosing to keep it in prime condition for maximum performance. Weather and atmospheric conditions cannot affect the rear surface where they are covered by the Mylar backing or when transparent. The screens shown in the system utilizing the same are therefore of considerable advantage to theater-type operations. With drive-ins, every problem of ambient light, weak projectors and the like is solved by the use of the screens of this invention. Even in walk-in theaters, where ambient light is no problem and in which projectors may use the costlier Xenon projectors, or utilize carbon electrodes at high consumption rates, significant advantages are attained because less expensive projectors can operate at a lower light flux level, thereby saving appreciable sums of money for operating expenses.

The screens of FIGS. 1—7 perform very well, but they do have an occasional tendency to reflect "hot spots," that is, areas of greater brilliance than their neighboring areas, both on the screen, and as viewed by members of the audience in different audience areas. The screen of FIGS. 9—16 overcomes this tendency by providing for a more general distribution of light from each area in the vertical plane. The improvement is noticeable.

When frosted, the front (sometimes called the "first") surface tends to prevent "hot spots," by providing a diffuse effect which, however, does not appear to destroy the clarity of the image, nor reduce its general brightness. The frosted surface treatment is optional.

The results secured with this screen are most striking in that they provide an image of great color saturation and contrast viewable through a restricted area, and independent of ambient conditions, which conditions heretofore have constituted an overwhelming limitation on the use of projection systems.

This invention is not to be limited by the embodiments shown in the drawings and described in the description, which are given by way of example and not of limitation.

I claim:

1. A projection screen comprising: a plate of transparent material having a generally upright reference plane, a front face facing the viewer, and a back face on the opposite side therefrom, a plurality of generally horizontal optical wedges forming said front face, each of said wedges comprising a transmission surface and an offset surface, the transmission surfaces constituting bent surfaces having a substantially horizontal line disposed vertically from the mid-elevation of the respective transmission surface, and between the top and bottom edges of the respective wedge, on both sides of which line the distance of the transmission surface from the reference plane continuously changes, the direction of change being the same on both sides thereof, and each of the offset surfaces extending between the top and bottom edges of its two adjacent transmission surfaces, the optical wedges being parallel to each other and to the reference plane, and a plurality of axially extending curved surfaces forming said back face, the curved surfaces extending parallel to each other and to the reference plane and each comprising an axial segment of a circular cylinder and being generally normal in plan view to the wedges, whereby the optical wedges refractively direct an incident light beam away from the normal to the reference axis in a generally vertical pattern, and the back face causes an angular fanning out of the beam emergent from the front face as viewed in a generally horizontal plane.

2. A projection screen according to claim 1 in which a reflective coating is formed on the back face whereby the fanning out is caused by reflection on the back face, the curved surfaces being concave as they face toward the front face.

3. A projection screen according to claim 2 in which the front face is frosted to a diffusive but primarily transmissive condition.

4. A projection screen according to claim 2 in which the reflective coating is metallic and adherent to the back face.

5. A projection screen according to claim 2 in which the reflective coating comprises a flexible metallized adhesive body adherent to the back face.

6. A projection screen according to claim 5 in which the front face is frosted to a diffusive but primarily transmissive condition.

7. A projection screen according to claim 2 in which the region of each of the optical wedges at and near the members of that set of intersections of the transmission surface and offset surfaces which is the farther of the sets of said intersections from the reference axis, is diffusely reflecting, and the remainder of each of the transmission surfaces is smooth and clear.

8. A projection screen according to claim 1 in which the curved surfaces are convex as they face toward the front face and the rear face is nonopaque, whereby the fanning out is caused by refraction at the back face.

9. A projection screen according to claim 8 in which the front face is frosted to a diffusive but primarily transmissive condition.

10. A projection screen according to claim 8 in which the region of each of the optical wedges at and near the members of that set of intersections of the transmission surfaces and offset surfaces which is the farther of the sets of said intersections from the reference axis, is diffusely reflecting, and the remainder of each of the transmission surfaces is smooth and clear.

11. A projection screen according to claim 1 in which the transmission surfaces are cylindrically arcuate.

12. A projection screen according to claim 1 in which the transmission surfaces are convex.

13. A projection screen according to claim 1 in which the transmission surfaces are concave.

14. A projection screen according to claim 1 in which each of the transmission surfaces is cylindrically arcuate, with the respective center of curvature at an elevation other than that of said mid-elevation of the respective wedge, and between the elevation of said top and bottom edges of the respective wedge.

15. A projection screen according to claim 14 in which a reflective coating is formed on the back face whereby the fanning out is caused by reflection at the back face, the curved surfaces being concave as they face toward the front face.

16. A projection screen according to claim 15 in which the transmission surfaces are frosted to a diffusive but primarily transmissive condition.

17. A projection installation comprising: a projector having a projection axis generally aligned with an audience direction, and a screen comprising: a plate of transparent material having a generally upright reference plane, a front face facing the viewer, and a back face on the opposite side therefrom, a plurality of generally horizontal optical wedges forming said front face, each of said wedges comprising a transmission surface and an offset surface, the transmission surfaces constituting bent surfaces having a substantially horizontal line disposed vertically from the mid-elevation of the respective transmission surface, and between the top and bottom edges of the respective wedge, on both sides of which the line distance of the transmission surface from the reference plane continuously changes, the direction of change being the same on both sides thereof, and each of the offset surfaces extending between the top and bottom edges of its two adjacent transmission surfaces, the optical wedges being parallel to each other and to the reference plane, and a plurality of axially extending curved surfaces forming said back face, the curved surfaces extending parallel to each other and to the reference plane and each comprising an axial segment of a circular cylinder and being generally normal in plan view to the wedges, whereby the principal property of the optical wedges is to refractively direct a light beam away from the normal to the reference axis in a generally vertical pattern, and the principal property of the back face is to cause an angular fanning out of the beam emergent from the front face as viewed in a generally horizontal plane.

18. A projection installation according to claim 17 in which the projector and the audience are on the same side of the screen, and in which a reflective coating is formed on the back face whereby the fanning out is caused by reflection at the back face, the curved surfaces being concave as they face toward the front face.

19. A projection installation according to claim 18 in which the front face is frosted to a diffusive but primarily transmissive condition.

20. A projection installation according to claim 18 in which the transmission surfaces are concave and cylindrically arcuate.

21. A projection installation according to claim 17 in which the projector and the audience are on opposite sides of the screen and in which the curved surfaces are convex as they face toward the front face and the rear face is nonopaque, whereby the fanning out is caused by refraction at the back face.

22. A projection installation according to claim 21 in which the front face is frosted to a diffusive but primarily transmissive condition.

23. A projection installation according to claim 21 in which the transmission surfaces are concave and cylindrically arcuate.

24. A projection installation according to claim 17 in which each of the transmission surfaces is cylindrically arcuate, with the respective center of curvature at an elevation other that of the said mid-elevation of the respective wedge, and between the elevation of said top and bottom edges of the respective wedge.

25. A projection screen comprising: a plate of transparent material having a generally upright reference axis, a front face facing the viewer, and a back face on the opposite side therefrom, a plurality of generally horizontal optical wedges forming said front face, each of said wedges comprising a flat planar transmission surface and an offset surface, the transmission surfaces forming acute angles with the reference axis, and each of the offset surfaces extending between the top and bottom edges of its two adjacent transmission surfaces, the optical wedges being parallel to each other, and a plurality of axially extending curved surface forming said back face, the curved surfaces extending parallel to each other and each comprising an axial segment of a circular cylinder and being generally normal in plan view to the wedges, whereby the principal property of the optical wedges is to refractively direct a light beam away from the normal to the reference axis, and the principal property of the back face is to cause an angular fanning out of the beam emergent from the front face as viewed in a generally horizontal plane.

26. A projection screen according to claim 25 in which a reflective coating is formed on the back face whereby the fanning out is caused by reflection at the back face, the curved surfaces being concave as they face toward the front face.

27. A projection screen according to claim 26 in which the front face is frosted to a diffusive but primarily transmissive condition.

28. A projection screen according to claim 26 in which the reflective coating is metallic and adherent to the back face.

29. A projection screen according to claim 26 in which the reflective coating comprises a flexible metallized adhesive body adherent to the back face.

30. A projection screen according to claim 29 in which the front face is frosted to a diffusive but primarily transmissive condition.

31. A projection screen according to claim 26 in which the region of each of the optical wedges at and near the members of that set of intersections of the transmission surfaces and offset surfaces which is the farther of the sets of said intersections from the reference axis, is diffusely reflecting, and the remainder of each of the transmission surfaces is smooth and clear.

32. A projection screen according to claim 25 in which the curved surfaces are convex as they face toward the front face and the rear face in nonopaque, whereby the fanning out is caused by refraction at the back face.

33. A projection screen according to claim 32 in which the front face is frosted to a diffusive but primarily transmissive condition.

34. A projection screen according to claim 32 in which the region of each of the optical wedges at and near the members of that set of intersections of the transmission surfaces and offset surfaces which is the farther of the sets of said intersections from the reference axis, is diffusely reflecting, and the remainder of each of the transmission surfaces is smooth and clear.

35. A projection installation comprising: a projector having a projection axis generally aligned with an audience direction, and a screen comprising: a plate of transparent material having a generally upright reference axis, a front face facing the viewer, and a back face on the opposite side therefrom, a plurality of generally horizontal optical wedges forming said front face, each of said wedges comprising a flat planar transmission surface and an offset surface, the transmission surfaces forming acute angles with the reference axis, and each of the offset surfaces extending between the edges of its two adjacent transmission surfaces, the optical wedges being parallel to each other, and a plurality of axially extending curved surfaces forming said back face, the curved surfaces extending parallel to each other and each comprising an axial segment of a circular cylinder and being generally normal in plan view to the wedges, whereby the principal property of the optical wedges is to refractively direct a light beam away from the normal to the reference axis, and the principal property of the back face is to cause an angular fanning out of the beam emergent from the front face as viewed in a generally horizontal plane.

36. A projection installation according to claim 35 in which the projector and the audience are on the same side of the screen, and in which a reflective coating is formed on the back face whereby the fanning out is caused by reflection at the back face, the curved surfaces being concave as they face toward the front face.

37. A projection installation according to claim 36 in which the front face is frosted to a diffusive but primarily transmissive condition.

38. A projection installation according to claim 35 in which the projector and the audience are on opposite sides of the screen and in which the curved surfaces are convex as they face toward the front face and the rear face is nonopaque, whereby the fanning out is caused by refraction at the back face.

39. A projection installation according to claim 38 in which the front face is frosted to a diffusive but primarily transmissive condition.

UNITED STATES PATENT OFFICE
CERTIFICATE OF CORRECTION

Patent No. 3,598,470　　　　　　　　　　Dated August 10, 1971

Inventor(s) RICHARD H. VETTER

It is certified that error appears in the above-identified patent and that said Letters Patent are hereby corrected as shown below:

| | | |
|---|---|---|
| Col 1, | line 28 | "filed" should be --field-- |
| | line 46 | after "that" insert --the-- |
| | line 59 | after "return" insert --a-- |
| Col. 2, | line 14 | "Property" should be --property-- |
| Col. 3, | line 36 | "fir" should be --for-- |
| | line 55 | "0187" should be --#187-- |
| | line 60 | "0447" should be --#447-- |
| Col. 4, | line 4 | "Fig. 2" should be --Fig. 3-- |
| | line 48 | "sue" should be --use-- |
| Col. 5, | line 43 | "Projection" should be --projection-- |
| | same line | "16 foot" should be --16-foot-- |
| | line 45 | "5 foot" should be --5-foot-- |
| | line 47 | "17 1/2 foot" should be --17 1/2-foot-- |
| Col. 6, | line 26 | "graNular" should be --granular-- |
| | line 44 | "70" should be --7°-- |
| Col. 7, | line 1 | after "that" insert a comma |
| | line 10 | "There is ....1°." is a repetition |
| Col. 8, line 42<br>Claim 2, line 3 | | "on" should be --at-- |
| Col. 8, line 58<br>Claim 7, line 3 | | "surface" should be --surfaces-- |
| Col. 9, line 12<br>Claim 14, line 4 | | before "said" insert --the-- |
| Col. 10, line 17<br>Claim 25, line 11 | | "surface" should be --surfaces-- |

Signed and sealed this 23rd day of January 1973.

(SEAL)
Attest:

EDWARD M. FLETCHER, JR.
Attesting Officer

ROBERT GOTTSCHALK
Commissioner of Patents